United States Patent
Moon et al.

(10) Patent No.: US 9,037,366 B2
(45) Date of Patent: May 19, 2015

(54) SYSTEM AND METHOD OF CONTROLLING FAIL SAFE FOR HYBRID VEHICLE

(71) Applicant: Hyundai Motor Company, Seoul (KR)

(72) Inventors: Seong Wook Moon, Seoul (KR); Jong Han Oh, Gyeonggi-Do (KR); Seok Min Jeong, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/105,760

(22) Filed: Dec. 13, 2013

(65) Prior Publication Data

US 2015/0100212 A1   Apr. 9, 2015

(30) Foreign Application Priority Data

Oct. 8, 2013   (KR) .................... 10-2013-0120201

(51) Int. Cl.
  *B60W 10/02*  (2006.01)
  *B60W 10/06*  (2006.01)
  *F16D 48/02*  (2006.01)

(52) U.S. Cl.
  CPC ............... *F16D 48/02* (2013.01); *B60W 10/06* (2013.01); *B60W 10/02* (2013.01)

(58) Field of Classification Search
  CPC ........................... B60W 10/02; B60W 10/06
  USPC ......... 701/54, 62, 68; 477/5, 77, 79, 174, 181
  See application file for complete search history.

(56) References Cited

U.S. PATENT DOCUMENTS

| 8,366,584 B2 | 2/2013 | Stefani et al. |  |
| 2009/0156355 A1* | 6/2009 | Oh et al. | 477/5 |
| 2010/0222973 A1* | 9/2010 | Senda et al. | 701/54 |
| 2012/0302396 A1* | 11/2012 | Park et al. | 477/5 |
| 2013/0296109 A1* | 11/2013 | Nedorezov et al. | 477/5 |

FOREIGN PATENT DOCUMENTS

| JP | 2002-349309 A | 12/2002 |
| JP | 2002-349310 A | 12/2002 |
| JP | 2002-354605 A | 12/2002 |
| JP | 2005-282600 A | 10/2005 |
| JP | 2007-285393 A | 11/2007 |
| KR | 10-2000-019323 | 4/2000 |
| KR | 10-2007-0012445 | 1/2007 |
| KR | 10-2008-0036333 | 4/2008 |
| KR | 10-2013-0051829 A | 5/2013 |

* cited by examiner

*Primary Examiner* — Edwin A Young
(74) *Attorney, Agent, or Firm* — Mintz Levin Cohn Ferris Glovsky and Popeo, P.C.; Peter F. Corless

(57) ABSTRACT

A system and method of controlling a fail-safe for a vehicle is provided. The method includes determining, by a controller, that remaining hydraulic pressure exists in the clutch when the clutch is not opened and a target value of oil pressure for opening the clutch is maintained for a predetermined time period. In addition, whether a vehicle is stopped is confirmed in response to determining that remaining hydraulic pressure exists in the engine clutch. The controller is further configured to transmit a signal to shift to the vehicle to a neutral (N) stage to a transmission controller and shift to the vehicle to the N-stage in response to determining that the vehicle is stopped. Then, the engine is driven by the controller in response to determining that the vehicle is shifted to the N-stage.

20 Claims, 2 Drawing Sheets

SYSTEM AND METHOD OF CONTROLLING FAIL SAFE FOR HYBRID VEHICLE

CROSS-REFERENCE TO RELATED APPLICATION

The present application claims priority to Korean Patent Application No. 10-2013-0120201 filed Oct. 8, 2013, the entire contents of which is incorporated herein for all purposes by this reference.

BACKGROUND (a) Technical Field

The present invention relates to a system and method of driving a hybrid vehicle, and more particularly, to a method of controlling a fail-safe with respect to problems of an engine clutch.

(b) Background Art

Generally, a Hybrid Electric Vehicle (HEV) is classified into a parallel type and a power split type wherein the parallel type is divided into a Flywheel Mounted Electric Device (FMED) type and a Transmission Mounted Electric Device (TMED) type depending on the location of a clutch. Particularly, for a TMED type hybrid vehicle, an engine clutch is disposed between an engine and a motor and the engine clutch is connected to drive the engine when the motor does not cover the power required by a driver, thereby meeting the power required by the driver.

A known control method of a hybrid vehicle that has a motor integrated typed-transmission, integrally includes a motor for driving a vehicle, a clutch and an engine are sequentially disposed, wherein the motor for driving a vehicle is connected to the engine and the motor integrated typed-transmission is not able to implement a neutral state includes: determining whether driving in an electric vehicle mode is possible when the vehicle is turned on; outputting an engine on signal when driving on an electric vehicle mode not impossible; decoupling the clutch when the engine on signal is output; driving the motor to turn on and increase engine speed when the decoupling of the clutch is completed; turning on the engine by injecting fuel and igniting the engine when the engine speed reaches a predetermined value through rotational force of the motor; and starting a vehicle by coupling the clutch when the engine is turned on.

However, when the engine is driven by coupling the engine clutch while power is provided by only a motor, the engine and a shaft of the motor have to be synchronized and coupled since impact or vibration may be produced. At this time, when remaining hydraulic pressure is produced in the engine clutch, the engine clutch may not be coupled smoothly and the impact due to the driving of the engine may be transferred to a driving shaft through the engine clutch, thereby providing an unpleasant feeling to a driver.

The description provided above as a related art of the present invention is merely for helping in understanding the background of the present invention and should not be construed as being included in the related art known by those skilled in the art.

SUMMARY

The present invention provides a system and method of controlling a fail-safe for a hybrid vehicle, that drives an engine by smoothly operating the coupling of the engine clutch even when the remaining hydraulic pressure is produced in the engine clutch.

In order to achieve the objects of the present invention, a method of controlling a fail-safe for a hybrid vehicle according to the present invention, may include: determining, by a controller, that the remaining hydraulic pressure exists in the engine clutch when the clutch is not opened even though a target value of oil pressure for opening the clutch is maintained for a predetermined time period; confirming, by a controller, whether a vehicle is stopped in response to determining that the remaining hydraulic pressure exists; transmitting a signal to shift to a neutral (N) stage to a Transmission Control Unit (TCU) from a Hybrid Control Unit (HCU) and shifting to the N-stage in response to determining that the vehicle is stopped; and driving, by the controller, an engine in response to the N-stage shift to operate a fail-safe process.

It may be determined that the remaining hydraulic pressure exists in the engine clutch when a hydraulic pressure of a sensor is not maintained at a predetermined value or less. Therefore, the confirmation process may be performed repeatedly in response to determining that the remaining hydraulic pressure does not exist.

The method of controlling a fail-safe for a hybrid vehicle may further include confirming, by the controller, whether the vehicle is in a coast down state in response to confirming that the vehicle is being driven. A hydraulic pressure of the engine clutch may be increased at a maximum level to couple the engine clutch in response to determining that a vehicle is in coast down state, and the engine may be rotated to a constant revolutions per minute (RPM) using a motor and the engine may be driven when the engine reaches to a predetermined RPM.

Additionally, the N-stage shifting process may be performed repeatedly by resending a signal that requests the N-stage shifting to TCU from HCU in response to not shifting to the N-stage. An under drive clutch may be decoupled in the N-stage shifting process. Further, the engine clutch may be controlled to not be decoupled after driving the engine in the fail-safe process.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

Figure 1:
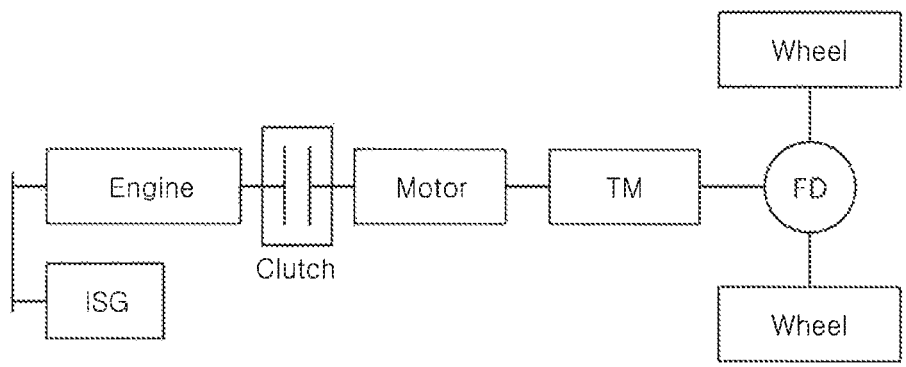
FIG. 1 is an exemplary block diagram showing a configuration of a TMED hybrid vehicle according to the related art.

It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Exemplary embodiments of a method of controlling a fail-safe for vehicle according to an exemplary embodiment of the present invention are described hereafter in detail with reference to the accompanying drawings.

Figure 2:
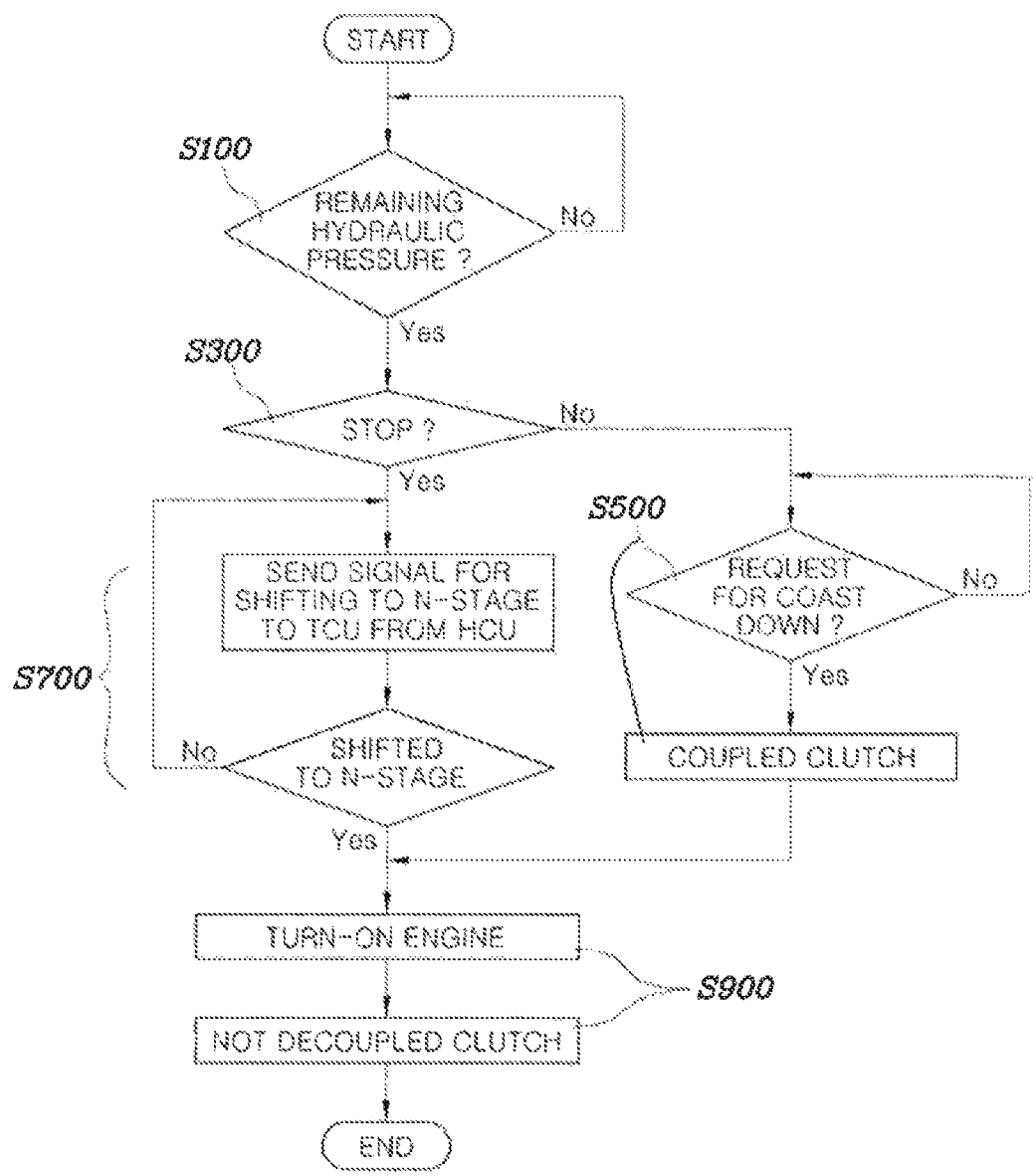
FIG. 2 is an exemplary flow chart showing a method of controlling a fail-safe for a hybrid vehicle according to an exemplary embodiment of the present invention.

FIG. 1 is an exemplary block diagram showing a configuration of a TMED hybrid vehicle according to the related art and FIG. 2 is an exemplary flow chart showing a method of controlling a fail-safe for a hybrid vehicle according to an exemplary embodiment of the present invention.

Generally, a TMED hybrid vehicle has a configuration of an engine clutch disposed between an engine and a motor, as shown in FIG. 1, wherein the engine clutch is coupled to drive the engine when insufficient power is produced with an operation of the motor, thereby obtaining the driving force required by a driver through engine power.

A method of controlling a fail-safe for a hybrid vehicle according to an exemplary embodiment of the present invention may include: determining, by a controller, that the remaining hydraulic pressure exists in the engine clutch when the clutch is not opened even though a target value of oil pressure for opening the clutch is maintained for a predetermined time period S100; confirming, by the controller, whether a vehicle is stopped in response to determining that the remaining hydraulic pressure exists S300; transmitting, by the controller (e.g., a Hybrid Control Unit HCU), a signal to shift to a neutral (N) stage to a Transmission Control Unit (TCU) and shifting to the N-stage in response to determining that the vehicle is stopped S700; and driving an engine in response to shifting to the N-stage S900 (e.g., a fail-safe process).

In particular, when the clutch is not opened even though a target value of hydraulic pressure for opening the clutch is maintained for a predetermined time period, the controller may be configured to determine that the remaining hydraulic pressure exists in an engine clutch. In addition, the controller may be configured to determine that the remaining hydraulic pressure exists in the engine clutch when a hydraulic pressure of a sensor is not maintained to a predetermined value or less. The target value of hydraulic pressure for opening the clutch may be about 0 bar and the clutch may be opened when the target value of hydraulic pressure is maintained at about 0 bar for about 5 seconds or more. In addition, when the hydraulic pressure of a sensor is not maintained at about 0.5 bar or less, the controller may be configured to determine that the remaining hydraulic pressure exists in an engine clutch. However, the specific reference values may be varied based on design choice or surrounding environment conditions, and thus is not limited to the specific numbers.

Further, in response to determining that the remaining hydraulic pressure does not exist in the engine clutch even when the states are maintained at predetermined values, the process of determining whether remaining hydraulic confirming exists (S100) may be repeated to confirm the remaining hydraulic in the engine clutch. In addition, the controller may be configured to determine whether a vehicle is stopped (S300) in response to determining that the remaining hydraulic pressure exists. In response to confirming that the vehicle is stopped, the controller may be configured to shift a transmission to the N-stage S700, and in response to confirming that the vehicle is being driven, the controller may be configured to determine whether the vehicle is in a coast down state (e.g., being driven downhill) S500.

In particular, when a vehicle is being driven, since an engine may not be driven after the vehicle is stopped, the engine may be driven while the vehicle is driven. In other words, to ignite the engine while the rotation number of a motor is substantially low, the coast down state may be confirmed, in which a driver steps off from an accelerator (e.g., the accelerator is disengaged) while the vehicle is driven and thus the vehicle may move under inertia. When the coast down state is confirmed S500, the hydraulic pressure of an engine clutch may increase to a maximum level to couple the engine clutch via the hydraulic pressure.

The fail-safe process S900 may include rotating, by the controller, the engine to a substantially constant RPM using a motor and the engine may be driven by injecting fuel thereto when the engine reaches to a predetermined RPM, and the engine clutch may be operated to be decoupled when the engine is driven. When the controller confirms that a vehicle is stopped S300, the controller may be configured to perform the N-stage shifting S700 wherein the controller may be configured to retransmit a signal for requesting the N-stage shifting to a TCU when a vehicle is not shifted to the N-stage, to repeat the N-stage shifting process S700 (e.g., until the vehicle is shifted to the N-stage).

Further, an under drive clutch may be decoupled for vibration or impact produced when an engine is driven to prevent the vibration from being transferred to a driver in the N-stage shifting process S700 and the fail-safe process S900 for driving the engine may be performed when a signal informing that a vehicle has been shifted to N-stage is received from TCU, maintaining, by the controller, a substantially constant driving state of the engine not to be turned off while a vehicle drives safely to a near repair shop, by operating the engine clutch to remain coupled (prevent from decoupling) after driving the engine.

The engine clutch is operated to remain coupled to protect a driver from a risk where a fail-safe mode fails, that is, the engine is not re-driven when re-driving the engine while the engine clutch is decoupled and the charging amount of a battery is substantially low, considering the goal of the fail-safe that a vehicle may drive to a near repair shop with minimal components when abnormal situations occur in the vehicle. Accordingly, since the engine may not be re-driven after the engine driving is stopped through decoupling the engine clutch, the engine clutch may be operated to remain coupled to constantly drive the engine.

According to the method of controlling a fail-safe for a vehicle as described above, the decrease of state of charge (SOC) of a battery and a decreased driving situation of a vehicle due to the inability of turning on the engine may be prevented in advance, thus improving marketability and ensuring safety of a driver.

The invention has been described in detail with reference to exemplary embodiments thereof. However, it will be appreciated by those skilled in the art that changes may be made in these exemplary embodiments without departing from the principles and spirit of the invention, the scope of which is defined in the accompanying claims and their equivalents.

What is claimed is:

1. A method of controlling a fail-safe for a vehicle, comprising:
   determining, by a controller, that remaining hydraulic pressure exists in an engine clutch when the engine clutch is not opened and a target value of oil pressure for opening the engine clutch is maintained for a predetermined time period;
   confirming, by the controller, whether the vehicle is stopped in response to determining that remaining hydraulic pressure exists in the engine clutch;
   transmitting, by the controller, a signal to shift the vehicle to a neutral (N) stage to a transmission controller and shifting to the N-stage in response to determining that the vehicle is stopped; and
   driving, by the controller, an engine when the vehicle is shifted to the N-stage.

2. The method of controlling a fail-safe for a vehicle of claim 1, wherein whether remaining hydraulic pressure exists in the engine clutch is determined when a hydraulic pressure of a sensor is maintained equal to or less than a predetermined value.

3. The method of controlling a fail-safe for a vehicle of claim 1, wherein the determination of remaining hydraulic pressure in the engine clutch is performed repeatedly in response to determining that the remaining hydraulic pressure does not exist in the engine clutch.

4. The method of controlling a fail-safe for a vehicle of claim 1, further comprising:
   confirming, by the controller, whether the vehicle is in a coast down state in response to determining that the vehicle is being driven.

5. The method of controlling a fail-safe for a vehicle of claim 4, wherein a hydraulic pressure of the engine clutch is increased at a maximum level to couple the engine clutch in response to confirming that the vehicle is in the coast down state, the engine is rotated to a substantially constant revolutions per minute (RPM) using a motor, and the engine is driven when the engine reaches a predetermined RPM.

6. The method of controlling a fail-safe for a vehicle of claim 1, wherein shifting to the N-stage is repeatedly performed by retransmitting, by the controller, a signal for requesting the N-stage shifting to the transmission controller until the vehicle is shifted to the N-stage.

7. The method of controlling a fail-safe for a vehicle of claim 1, wherein an under drive clutch is decoupled when the vehicle is shifted to the N-stage.

8. The method of controlling a fail-safe for a vehicle of claim 1, wherein the engine clutch is operated, by the controller, to remain coupled after driving the engine.

9. A system of controlling a fail-safe for a vehicle, comprising:
   a memory configured to store program instructions; and
   a processor configured to execute the program instructions, the program instructions when executed configured to:
      determine that remaining hydraulic pressure exists in an engine clutch when the engine clutch is not opened and a target value of oil pressure for opening the engine clutch is maintained for a predetermined time period;
      confirm whether the vehicle is stopped in response to determining that remaining hydraulic pressure exists in the engine clutch;
      transmit a signal to shift the vehicle to a neutral (N) stage to a transmission controller and shifting to the N-stage in response to determining that the vehicle is stopped; and
      drive an engine when the vehicle is shifted to the N-stage.

10. The system of claim 9, wherein whether remaining hydraulic pressure exists in the engine clutch is determined when a hydraulic pressure of a sensor is maintained equal to or less than a predetermined value.

11. The system of claim 9, wherein the determination of remaining hydraulic pressure in the engine clutch is performed repeatedly in response to determining that the remaining hydraulic pressure does not exist in the engine clutch.

12. The system of claim 9, wherein the program instructions when executed are further configured to:
   confirm whether the vehicle is in a coast down state in response to determining that the vehicle is being driven.

13. The system of claim 12, wherein a hydraulic pressure of the engine clutch is increased at a maximum level to couple the engine clutch in response to confirming that the vehicle is in the coast down state, the engine is rotated to a substantially constant revolutions per minute (RPM) using a motor, and the engine is driven when the engine reaches a predetermined RPM.

14. The system of claim 9, wherein shifting to the N-stage is repeatedly performed by retransmitting a signal for requesting the N-stage shifting to the transmission controller until the vehicle is shifted to the N-stage.

15. The system of claim 9, wherein an under drive clutch is decoupled when the vehicle is shifted to the N-stage.

16. The system of claim 9, wherein the engine clutch is operated to remain coupled after driving the engine.

17. A non-transitory computer readable medium containing program instructions executed by a controller to control a fail-safe of a vehicle, the computer readable medium comprising:
- program instructions that determine that remaining hydraulic pressure exists in an engine clutch when the engine clutch is not opened and a target value of oil pressure for opening the engine clutch is maintained for a predetermined time period;
- program instructions that confirm whether the vehicle is stopped in response to determining that remaining hydraulic pressure exists in the engine clutch;
- program instructions that transmit a signal to shift the vehicle to a neutral (N) stage to a transmission controller and shifting to the N-stage in response to determining that the vehicle is stopped; and
- program instructions that drive an engine when the vehicle is shifted to the N-stage.

18. The non-transitory computer readable medium of claim 17, wherein whether remaining hydraulic pressure exists in the engine clutch is determined when a hydraulic pressure of a sensor is maintained equal to or less than a predetermined value.

19. The non-transitory computer readable medium of claim 17, wherein the determination of remaining hydraulic pressure in the engine clutch is performed repeatedly in response to determining that the remaining hydraulic pressure does not exist in the engine clutch.

20. The non-transitory computer readable medium of claim 17, further comprising:
- program instructions that confirm whether the vehicle is in a coast down state in response to determining that the vehicle is being driven.

* * * * *